United States Patent [19]

Henry

[11] Patent Number: 5,436,664
[45] Date of Patent: Jul. 25, 1995

[54] METHOD FOR MASKING TRANSMISSION ERRORS OF MPEG COMPRESSED PICTURES

[75] Inventor: Michel Henry, Le Fontanil, France

[73] Assignee: SGS-Thomson Microelectronics S.A., Gentilly, France

[21] Appl. No.: 122,240

[22] Filed: Sep. 16, 1993

[30] Foreign Application Priority Data

Sep. 18, 1992 [FR] France ................. 92 11555

[51] Int. Cl.$^6$ .............................................. H04N 7/50
[52] U.S. Cl. ..................... 348/402; 348/423
[58] Field of Search ............... 348/423, 402, 407, 413, 348/616, 701; H04N 7/133, 7/137

[56] References Cited

U.S. PATENT DOCUMENTS 5,146,325 9/1992 Ng ....................................... 348/384
5,212,549 9/1993 Ng ....................................... 348/409

OTHER PUBLICATIONS

IEEE Journal on Selected Areas in Communication, vol. 7, No. 5, Jun. 1989, New York, US, pp. 807–814, M. Wada, "Selective Recovery of Video Packet Loss Using Error Concealment".
International Conference on Communications ICC '91, vol. 1/3, Jun. 23, 1991, IEEE, New York, US, pp. 496–500, F. C. Jeng et al., "Concealment of Bit Error and Cell Loss in Inter-frame Coded Video Transmission".
Communications of the Association for Computing Machinery, vol. 34, No. 4, Apr. 1991, New York, US, pp. 46–58, D. Le Gall, "MPEG: A Video Compression Standard for Multimedia Applications".
Electronic Design, May 23, 1991, pp. 49–53, Milt Leonard, "IC Executes Still-Picture Compression Alogrithms".
Electronic Design, Apr. 2, 1992, pp. 45–54, Milt Leonard, "Silicon Solution Merges Video, Stills, and Voice".

Primary Examiner—Howard W. Britton
Attorney, Agent, or Firm—Wolf, Greenfield & Sacks

[57] ABSTRACT

A method masks errors in a transmission system of a picture sequence including a first series of pictures that are autonomously coded by pixel blocks (intra coding). Each picture of the first series is followed by several pictures of a second series of pictures that are differentially coded by blocks with respect to at least one reference picture of the first series of pictures (inter coding). The codes of each block of the second picture series comprise at least a motion vector between the pixels of the block and the pixels of the elements of the reference picture. The method provides for adding, to the data corresponding to each block of an intrapicture, data indicating the motion vector of this block with respect to at least one additional picture, and, if a transmission error is detected, the error blocks of the intrapicture are processed like error blocks of an interpicture.

16 Claims, 2 Drawing Sheets

METHOD FOR MASKING TRANSMISSION ERRORS OF MPEG COMPRESSED PICTURES

BACKGROUND OF THE INVENTION

1. Field of the Invention

The present invention relates to the coding, transmission and decoding of digitally coded video pictures. It more particularly relates to masking of errors in the transmission of television picture sequences in which successive pictures alternately include an intrinsically coded picture (intrapicture) and pictures differentially coded as a function of the preceding and/or following pictures (interpictures).

2. Discussion of the Related Art

A transmission technique using alternate pictures corresponds to MPEG coding, described in "MPEG: a Video Compression Standard for Multimedia Applications", by Didier Le Gall, Communications of the ACM, April 1991, vol. 34, No. 4.

FIG. 1 of the present application schematically represents a picture transmission system. This system first includes an imaging device 1 followed by an encoder 2 that compresses and codes the picture. The coded and compressed picture is conveyed by a transmission device 3 (that can be a cable link, a radio link, an optical link, etc.) associated with logic circuits to a receiver that includes a decoder and decompressor 4 (complementary to the encoder 2) and provides picture sequences to be displayed on a screen 5.

The above-mentioned MPEG standard is particularly characterized in that a sequence of pictures to be transmitted is divided into picture groups. A group includes successive pictures, the first one of which is a so-called "intra" picture, and the following ones are so-called "inter" pictures. FIG. 2 illustrates such a sequence with a first group including a first intrapicture 10 followed by interpictures 11, 12, 13 . . . , and a second group including a first intrapicture 20 followed by several interpictures 21, 22 . . .

The first picture of a group is coded in intramode, that is, according to a fixed picture compression technique based on the discrete cosine transform (DCT). Thus, the picture such as picture 10 or picture 20 is intrinsically coded through partition of the picture into blocks, cosine transform of each block, quantification of the cosine transform coefficients, and entropy coding of the quantified coefficients. Such an exemplary coding mode and device for the fabrication thereof can be found in the article "Electronic Design", May 23, 1991, pp. 49-53, by Milt Leonard.

The following pictures (11, 12, 13 . . . 21, 22 . . . ) are coded as interpictures, that is, differentially as a function of the preceding and/or following pictures. Indeed, in a normal scene viewed by a TV camera, there is little difference between a picture and the immediately preceding or following pictures, except for a few translational motions. For example, the background (landscape) can move by a translational motion due to the displacement of the camera, and some elements of the picture can themselves move by a translational motion with respect to the background (such as people or a car).

FIGS. 3A and 3B show an example of such a situation. FIG. 3A shows a frame portion partitioned into blocks Bij, and FIG. 3B illustrates a reference frame portion partitioned into blocks B'ij. When comparing both pictures, it can be seen that block B13 of FIG. 3A resembles, for example, block B'12 and that it can be deduced from block B'12 by determining a motion vector V13 and data characterizing the minor differences between blocks B'12 and B13. Similarly, block B26 corresponds to a picture portion consisting of a part of each of blocks B'23, B'24, B'33 and B'34, and can be deduced therefrom by a motion vector V26 and difference data. Additionally, it will be understood that, generally, immediately adjacent blocks are very likely to be associated with substantially identical motion vectors. Coding of a picture in inter mode includes the following steps:

partitioning into blocks, estimating the motion as compared to the adjacent pictures in order to provide one or several motion vectors with respect to each of these adjacent pictures, extracting a predictor block from one or several adjacent pictures, carrying out the cosine transform of the difference between each block and its predictor, quantifying the transform coefficients, entropically coding the predictor displacement and the quantified coefficients with respect to the block.

A description of an inter coding method and of a device for the implementation thereof can be found in the article by Milt Leonard, "Electronic Design", April 2, 1992, pp. 45-54.

The transmission device 3 receives a bit string provided by the encoder and the partition into data packets. As shown in FIG. 4, the transmission device 3 adds to each data packet P1, P2, P3 . . . identification codes and an error detection/correction code. Then, the data packets are transmitted and, upon reception, data packets are recovered, their error detection/correction code is analyzed and their content is provided to the decoder.

Upon reception of a data packet, when the transmission device 3 detects one or several transmission errors in the data packet, either it can correct these errors (this operation is automatically carried out without action of the decoder), or its error correction capacity is exceeded; in that case, the transmission device signals to the decoder that a data packet is lost. It is then no longer possible to correct the error but it can be attempted to mask the consequences thereof (it should be noted that a transmitted data packet generally corresponds to several blocks resulting from the above-mentioned partitioning into blocks).

In the case of an intra-coded picture, one solution provides for replacing the missing blocks with blocks placed at the same position in a preceding picture. However, this masking step may prove inappropriate if the picture in error corresponds to a picture that rapidly moves with respect to the preceding picture.

In the case of inter-coded pictures, since the motion vectors adjacent to the missing blocks are available, it is possible to estimate the motion vectors and the difference coefficients of the missing blocks, for example by averaging the motion vectors and difference coefficients of the adjacent blocks, and thus to replace the missing blocks by blocks from a preceding picture with estimated motion vectors and difference coefficients.

Therefore, the masking of missing blocks is not so good in the case of intra-pictures as in the case of inter-pictures. This is particularly impairing because errors on intrapictures are more detrimental than errors on interpictures since they have repercussions, step by step, on the next inter-coded pictures whose coding is carried out from these intrapictures.

Therefore, in the prior art, the error correction systems have been enhanced for intrapictures, but such enhancement is not limitless because it requires to increase the number of bits assigned to the detection and correction of errors in each data packet of the transmission device and to substantially increase the complexity of the hardware assigned to the processing of errors.

SUMMARY OF THE INVENTION

An object of the invention is to provide a method for masking errors of an intra-coded picture in a picture transmission system alternatively including intrapictures and interpictures.

Another object of the invention is to provide such an error masking method that does not require to substantially increase the number of data to be transmitted.

A further object of the invention is to provide such an error masking system that does not require more complex coding and decoding elements.

To achieve these objects, the invention provides a method for masking errors in a transmission system of a sequence of pictures including a first series of pictures that are autonomously coded by pixel blocks (intra coding), each picture of the first series being followed by several pictures of a second series of pictures that are differentially coded by blocks with respect to at least one reference picture of the first series of pictures (inter coding), the codes of each block of the second picture series comprising at least a motion vector between the pixels of this block and the pixels of elements of the reference picture. The method according to the invention includes the steps consisting in adding, to the data corresponding to each block of an intrapicture, data indicating the motion vector of this block with respect to at least another picture, and, if a transmission error is detected, processing the error blocks of the intrapicture like error blocks of an interpicture.

According to an embodiment of the invention, the data indicating the motion vector of an intrapicture block are transmitted with a predetermined delay with respect to the data of this block that are coded in intra mode.

The foregoing and other objects, features, aspects and advantages of the invention will become apparent from the following detailed description of the present invention when taken in conjunction with the accompanying drawings.

DETAILED DESCRIPTION

Figure 1:
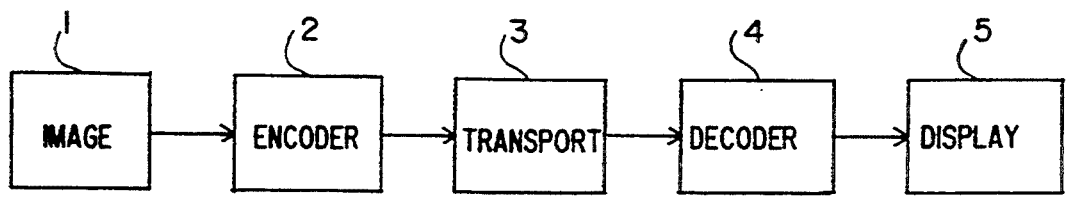
FIG. 1, above described, is a block diagram of a picture transmission system.
Figure 2:
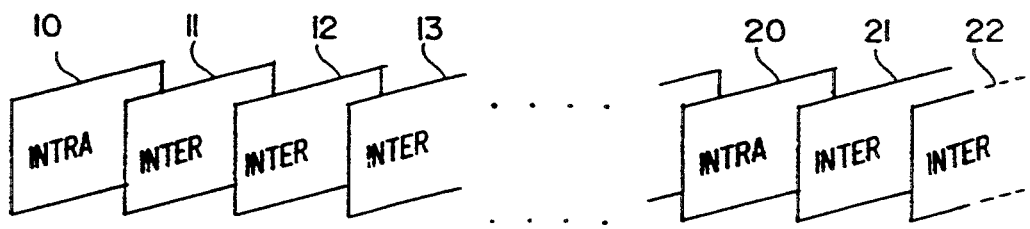
FIG. 2 schematically illustrates MPEG coding of successive pictures.
Figure 3A:
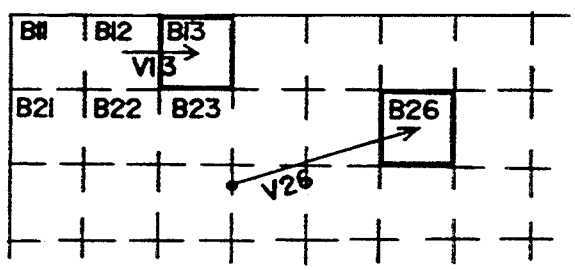
FIGS. 3A and 3B schematically illustrate a method for providing inter-coding and motion vectors.
Figure 3B:
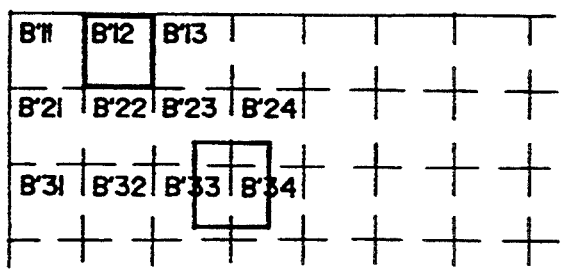
Figure 4:
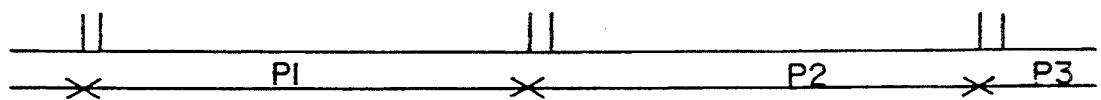
FIG. 4 schematically illustrates data packets transmitted by a transmission system.

The invention, instead of increasing the complexity of the error detection and correction system associated with the transmission of an intrapicture, provides for adding to the intra coding of each block of an intrapicture the indication of a motion vector obtained as in the case of an interpicture. This redundant motion vector is used when a data packet is lost in order to replace each missing block with the portion of the picture from which the motion vector has been obtained. It should be noted that the invention does not require, for coding pictures, the full superposition of an intra coding and an inter coding. One adds, to the intra coding information of each block, only the motion vector information of this block and not the information on the difference between the initial block and the final block, or only a very small portion of this information.

In a system sequentially transmitting intrapictures and interpictures, the inter coding system can be used to provide this motion vector without increasing the complexity of the hardware of the coding system.

It will also be exemplified that the addition of a motion vector to an intra-coded picture block causes a negligible increase in the number of information to be transmitted.

Consider, for example, a TV picture that includes $720 \times 576$ pixels and is partitioned into blocks of $16 \times 16$ pixels (that is, a picture includes 1,620 blocks). In conventional systems, in order to code a motion vector, less than 16 bits must be used. Hence, for a full picture, $1,620 \times 16$ additional bits are necessary, i.e., approximately 26,000 bits for the provision of redundant motion vectors. In an example wherein there is one intrapicture for each group of 16 pictures, the remaining pictures being interpictures, the number of bits to be provided for coding a group of pictures is approximately equal to 3.6 megabits. Thus, the coding of redundant motion vectors typically represents less than 0.7% of the total number of the transmitted bits. This value increases up to 1.4% if there is one intrapicture for each group of 8 successive pictures.

Once an intrapicture is coded by associating with the data of each block the coding of a redundant vector, there are several ways of transmitting the information and several ways of using the information thus transmitted should an error occur.

In a first implementation, the data of each block and the bits of the redundant vector corresponding to the sequence are sequentially sent. In this case, it is very likely that, if a data packet gets lost, the information on a block and the associated redundant motion vector are simultaneously lost. It will then be possible to use the error masking system conventionally used in the case of interpictures, that consists in replacing the motion vectors of the missing blocks with the motion vectors that are estimated from motion vectors of adjacent blocks. Indeed, generally, a data packet sent by the transmission system corresponds to data of several blocks. A preferred alternative implementation of the invention consists, during coding and assembling into data packets, in associating to each block the motion vector of a preceding or following block, shifted by a predetermined number of blocks, the predetermined number being chosen so as to be higher than the maximum number of blocks included in a data packet. Thus, when a data packet is lost, the information relating to the motion vector of the lost blocks is found in one of the following or preceding packets; so, it is possible to assign to each lost block its exact motion vector without resorting to an estimation step.

Figure 5:
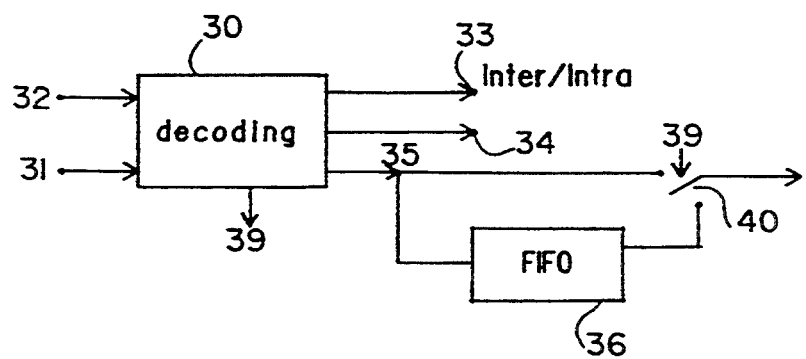
FIG. 5 is a schematic block diagram of an error masking system implementing the invention.

FIG. 5 is a block diagram illustrating a system applicable to the invention. The system provides the conventional masking of inter errors as well as the masking of intra errors according to the invention.

Any conventional decoder includes an error masking system that includes an entropy decoding module 30 receiving at a first input 31 the bits from a transmit-ted data packet, and at a second input 32 information on the possible loss of a data packet. Decoder 30 provides, at a first output 33, information indicative of whether the received data correspond to an inter or intra picture; at a second output 34, information corresponding to the DCT coefficients; and, at a third output 35, information corresponding to motion vectors.

Normally, when receiving interpictures, outputs 34 and 35 are used, and when receiving intrapictures, output 34 only is used. The invention provides for adding to output 35 a first-in/first-out (FIFO) memory 36 in which are stored the data corresponding to successive vectors. When a signal indicating the loss of a data packet arrives at input 32, during the occurrence of an intrapicture, the decoder switches to the inter mode and provides a signal 39 that acts on a switch 40 in order to provide the output of the FIFO 36 instead of the direct vector output 35. Hence, for missing blocks in an intrapicture, one uses the vector information instead of the available but erroneous DCT coefficients in order to restore the picture from a preceding block. Buffer 36 is used, as above indicated, in order to recover motion vectors of an intra block transmitted with a preceding (or following) data packet. Thus, an advantage of the invention is that it can use pre-existing error masking systems for interpictures and apply them to an intrapicture. Additionally, as above indicated, the systems for coding redundant vectors do not require to increase the complexity of the system since such motion vector estimation devices are anyway available and are not used during the normal coding of an intrapicture.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method for masking errors in a transmission system of a picture sequence including a first series of pictures (intrapictures) that are autonomously coded by pixel blocks (intra coding), each picture of the first series being followed by several pictures of a second series of pictures (interpictures) that are differentially coded by blocks with respect to at least one reference picture of the first series of pictures (inter coding), the codes of each block of the second picture series comprising at least a motion vector between the pixels of said block and the pixels of elements of the reference picture, comprising the following steps:

adding, to the data corresponding to a given block of an intrapicture, data indicating a motion vector of the given block with respect to at least one other picture, and, if a transmission error is detected, processing an erroneous block of an intrapicture based upon said data indicating a motion vector of said erroneous block.

2. A method according to claim 1, further comprising the step of:

transmitting data indicating the motion vector of an intrapicture block with a predetermined delay with respect to a transmission of data of this same block coded by intra coding.

3. A method according to claim 1, further comprising the step of processing the codes of each block of the second picture series to obtain picture data, and wherein said motion vector of said erroneous block is processed in the same manner as said codes of each block of the second picture series.

4. A method for masking errors in a transmission system of a picture sequence including a first series of pictures that are autonomously coded by pixel blocks to produce intracoded data, each picture of the first series being followed by several pictures of a second series of pictures that are differentially coded by blocks with respect to at least one reference picture of the first series of pictures to produce intercoded data including at least a motion vector between a pixel of a picture of the second series of pictures and a pixel of the at least one reference picture, the method comprising the steps of:

producing, for use with a given block of a picture of the first series of pictures, data indicative of a motion vector of the given block with respect to at least a portion of at least one other picture; and processing data indicative of the motion vector of the given block, when a transmission error is detected in the picture of the first series that includes the given block.

5. A method according to claim 4, further comprising the step of:

transmitting data indicative of the motion vector of the given block with a predetermined delay with respect to a transmission of intracoded data of the given block.

6. A method according to claim 4, further comprising the step of processing the codes of each block of the second picture series to obtain picture data, and wherein said motion vector of said given block is processed in the same manner as said codes of each block of the second picture series.

7. An error masking apparatus for masking errors in a transmission system of a picture sequence, comprising:

an output;

first input means for receiving a stream of bits organized by data packets, the stream of bits having a plurality of blocks of data representing a series of pictures, including a first series of pictures that are autonomously coded by pixel blocks to produce intracoded data including DCT coefficients, each picture of the first series being followed by several pictures of a second series of pictures that are differentially coded by blocks with respect to at least one reference picture of the first series of pictures to produce intercoded data including at least a motion vector between a pixel of a picture of the second series of pictures and a pixel of the at least one reference picture;

second input means for receiving a signal indicative of the loss of a data packet;

decoding means for decoding the stream of bits, including means for determining whether a given block extracted from the stream of bits is intracoded or intercoded, and means for producing a stream of DCT coefficients associated with the first series of pictures, a stream of motion vectors associated with the first series of pictures, and a stream of motion vectors associated with the second series of pictures;

buffer memory means for storing a portion of the stream of motion vectors associated with the first series of pictures; and switch means for switching motion vectors from the buffer memory to the output, on receipt of a signal indicative of the loss of a data packet.

8. The error masking apparatus of claim 7 further comprising:

motion vector means connected to said output for processing said first stream of motion vectors to obtain said first series of pictures and said second stream of vectors to obtain said second series of pictures;

DCT coefficient means for processing said stream of DCT coefficients to obtain said first series of pictures;

selection means for selecting one of said motion vector means and said DCT coefficient means.

9. The error masking apparatus of claim 8, wherein said selection means selects said motion vector means upon receipt of said signal indicative of the loss of a data packet.

10. A method for transmitting pictures, comprising the steps of:

coding blocks of a first series of pictures to produce intracoded data, each picture of said first series being followed by at least one picture from a second series;

coding blocks of said first series of pictures to produce first motion vector data with respect to at least another picture;

coding blocks of a second series of pictures to produce second motion vector data with respect to at least one picture of said first series of pictures;

transmitting said intracoded data and said first and second motion vector data;

receiving said intracoded data and said first and second motion vector data;

decoding said intracoded data to produce said first series of pictures;

decoding said second motion vector data to produce said second series of pictures;

determining loss of intracoded data for a given block; and decoding first motion vector data associated with said given block when a loss is determined.

11. The method of claim 10, wherein said decoding of said first motion vector data is performed in the same manner as said decoding of said second motion vector data.

12. The method of claim 10, wherein first motion vector data associated with a block of a picture of said first series of pictures is transmitted with intracoded data associated with said block.

13. The method of claim 10, wherein said first motion vector data associated with a block of a picture of said first series of pictures is transmitted with said intracoded data associated with a different block.

14. A picture transmission system for coding, transmitting and decoding a plurality of pictures, said system comprising:

an intracoding processor for coding blocks of first selected pictures of said plurality of pictures to produce intracoded data, each of said first selected pictures being followed by at least one of second selected pictures of said plurality of pictures;

a motion vector processor for coding blocks of said plurality of pictures to produce motion vector data;

a transmitter for transmitting said intracoded data and said motion vector data;

a decoder receiving said intracoded data and said motion vector data and decoding said data to produce said plurality of pictures.

15. The picture transmission system of claim 14, wherein said decoder includes:

motion vector means for decoding motion vector data;

intracoding means for decoding intracoded data;

selection means for selecting one of said motion vector means and said intracoding means based upon whether data corresponds to said first selected pictures or said second selected pictures.

16. The picture transmission system of claim 15, wherein said selection means selects said motion vector means when data corresponds to said first selected pictures and a transmission error occurs.

* * * * *